United States Patent [19]

Gottlieb et al.

[11] 4,395,702
[45] Jul. 26, 1983

[54] BULK ACOUSTIC WAVE INTEGRATED OPTICAL DEFLECTOR AND MONOLITHIC A/D CONVERTER USING SUCH DEFLECTOR

[75] Inventors: Milton Gottlieb, Pittsburgh; Gerald B. Brandt, Edgewood Borough, both of Pa.

[73] Assignee: Westinghouse Electric Corp., Pittsburgh, Pa.

[21] Appl. No.: 273,177

[22] Filed: Jun. 12, 1981

Related U.S. Application Data

[62] Division of Ser. No. 82,513, Oct. 9, 1979, Pat. No. 4,348,075.

[51] Int. Cl.$^3$ .............................. H03K 13/02
[52] U.S. Cl. .................. 340/347 AD; 340/347 M; 350/358
[58] Field of Search ............ 350/96.13; 340/347 AD, 340/347 P, 347 M

[56] References Cited

U.S. PATENT DOCUMENTS 3,710,041  1/1973  Hayashi et al. ............ 307/317 A X
4,169,662  10/1979  Kaule et al. ........................ 350/358
4,185,274  1/1980  Giallorenzi ..................... 340/347 P

OTHER PUBLICATIONS

Brandt et al., More on Integrated Optics, Optical Spectra, 3/1976, pp. 46–48.

Primary Examiner—T. J. Sloyan
Attorney, Agent, or Firm—C. M. Lorin

[57] ABSTRACT

Method and apparatus is described for interacting bulk acoustic waves with an optical waveguide on a common substrate to switch, modulate or deflect guided light at a very high speed. A direct application lies in a monolithic optical analog-to-digital converter. To this effect, a plurality of transducer elements regularly spaced in an array across the optical waveguide are controlled with constant or variable phase shift along a slope, thus causing deflection of the guided light in a fashion analog to phased-array radar technique. A fully integrated monolithic device is constructed combining the bulk acoustic wave generating and optical waveguide functions.

3 Claims, 8 Drawing Figures

BULK ACOUSTIC WAVE INTEGRATED OPTICAL DEFLECTOR AND MONOLITHIC A/D CONVERTER USING SUCH DEFLECTOR

This is a division of application Ser. No. 82,513, filed 10/9/79 U.S. Pat. No. 4,348,075.

BACKGROUND OF THE INVENTION

The invention relates to optical processing apparatus in general, and more particularly to integrated optics, e.g., to a solid-state device in which guided light is modulated by electrical control means as in the field of electronics.

It has been recognized for many years that optical devices can advantageously be used to process information in a mono- or bi-dimensional format. This results from the Fourier transform properties of certain optical systems. This capability has been put to use for performing complex operations such as spectrum analysis, correlation, convolution and image enhancement.

A definite superiority of optical processing lies in the ability to simultaneously operate upon many information channels, or bits, so that processing can proceed at great speed and often an output can be derived in real time with relatively little system complexity.

Developments in integrated optics have further increased the interest in optical processing methods. In particular thin-film techniques applied to light waveguides have made possible a high degree of miniaturization of optical devices. The next step was to interface the optics to the integrated electronic components of the system, in which a common substrate may be shared by both optical and electronic components, e.g., silicon. Optical signal processing in a thin-film wave guide is accomplished with some form of modulation or deflection of the beam of light. To this end, integrated optic modulation or deflection has been developed in three parallel modes of modulating or deflecting light traveling in a thin-film waveguide: (1) the electrooptic effect, (2) the magneto-optic effect and (3) the acousto-optic effect. A shortcoming of the first two modes is that the waveguide material must be either an electro-optic, or magneto-optic material. Consequently, they do not lend themselves to integration on a common substrate. In contrast, the acousto-optic effect occurs in all materials and a waveguide suitable for deposition on a silicon substrate may be chosen. Two types of acousto-optic interactions are possible. One consists in using an acoustic surface wave. A drawback lies in that the interaction is limited in bandwith by attenuation and in time resolution by the travel time of the acoustic wave across the light beam (in the order of one microsecond). The second mode consists in using bulk acoustic waves for modulating guided light. This method, described in the Article "Bulk Acoustic Wave Interaction with Guided Optical Waves" by G. B. Brandt, M. Gottlieb and J. J. Conroy in Applied Physics Lettrs, Vol. 23, No. 2, July 15, 1973 pp. 53–54, uses a configuration in which the acoustic wave propagates normally to the light guide. This technique, as further described in U.S. Pat. No. 3,856,378 of Gerald B. Brandt and Milton Gottlieb, provides on a common substrate for passing ultrasonic acoustic waves, either longitudinal or shear bulk waves, through one or several parallel optical channels.

Integrated optics technology has become more and more promising for the field of high-data-rate communication, in particular for surface and space applications. With increased complexity analagous to solid-state technology in the field of electronics, several functions have been added on a common substrate. Typical of the progress made is the device described by Gary E. Marx, Milton Gottlieb and Gerald B. Brandt in IEEE Journal on Solid State Circuits. Vol. SC-12, No. 1 of February 1977, pp. 10–13 entitled Integrated Optical Detector Array, Waveguide, and Modulator Based on Silicon Technology". An integrated optical (IO) hybrid circuit has been fabricated, as explained in the article, by coupling on a common silicon substrate an IO modulator and a photo-detector array. It uses the aforementioned interaction between guided light and bulk acoustic waves. A transducer element operates on an optical waveguide to deflect the guided light onto a linear array of p-n junction photodiode detectors formed on the silicon substrate common to the transducer element, the optical waveguide and the photo-detectors. The present invention takes advantage of the existing technology, it also takes inspiration from phased-array radar technology.

Phased-array radar has been developed in the direction of a fully integrated microwave circuit. See "Microwave Semiconductor Devices" by H. V. Shurmer, pp. 215–217 published in 1971 by John Wiley & Sons. By analogy with the phased-array radar technique, the prior art shows that an A/D converter has been conceived by coupling a light beam deflector with an array of photoelectric detectors. See "Electrooptic Phased-Array Light Beam Deflector with Application to Analog-to-Digital Conversion" by P. Saunier, C. S. Tsai, I. W. Yao and Le T. Nguyen, a paper presented at the Topical Meeting on Integrated and Guided Wave Optices, Jan. 16–18, 1978, Salt Lake City, Utah under the sponsorship of The Optical Society of America (Tu $C_2.1$ to 4). However, this paper does not show the use of bulk acoustic waves, nor a fully integrated solid-state device. This is also the case with U.S. Pat. No. 4,058,722 of Henry F. Taylor.

An object of the present invention is to provide a solid-state light deflector using acoustic wave interaction with guided light.

Another object of the present invention is to provide a monolithic A/D converter using the interaction of acoustic waves with guided light to convert analog signals into digital signals.

SUMMARY OF THE INVENTION

The invention resides in a monolithic device combining on a common substrate:

an optical waveguide disposed in a plane of said common substrate; and at least two transducer elements disposed parallel to the operative direction of said optical waveguide for passing respective ultrasonic bulk waves through parallel channels of said optical waveguide and in a direction normal to the plane thereof for interaction with light guided in said parallel channels, respectively; and means on said substrate coupled with said transducer elements for introducing a controllable phase shift between said ultrasonic bulk waves in relation to a predetermined electrical signal; whereby said guided light is selectively deflected transversely of said ultrasonic bulk waves and in said plane as a result of said interaction and of said phase shift.

The invention also resides in an optical analog-to-digital (A/D) converter combining on a single substrate:

an optical waveguide disposed in a plane of said common substrate;

a plurality of transducer elements for passing respective ultrasonic bulk waves across discrete paths of the light guided by said optical waveguide and in a direction normal to the plane thereof;

a plurality of phase shifting means responsive to an analog signal being mounted on said substrate and connected between consecutive said transducer elements for introducing a phase shift between said ultrasonic bulk waves in relation to said analog signal;

a plurality of photo detectors spatially disposed on said common substrate so that angle of light deflection relates to detector position, and adapted for selective coupling with said guided light after said interaction; and means responsive to said photo detectors for providing a digital signal characteristic of the magnitude of said analog signal.

DESCRIPTION OF THE INVENTION

The invention relates to the use of bulk acoustic waves for switching, modulating or deflecting a light beam within the confines of an integrated optical solid-state device. It is applicable to integrated optic (IO) signal processing in general, such as used in communications, and in particular to analog-to-digital conversion at very high speeds.

The invention lies in the use of bulk acoustic wave interaction with an optical waveguide as explained in the aforementioned article by G. B. Brandt, M. Gottlieb and J. J. Conroy in Applied Physics Letters, Vol. 23 No. 2, July 15, 1973 pp 53–54, or in U.S. Pat. No. 3,856,378.

Figure 1:
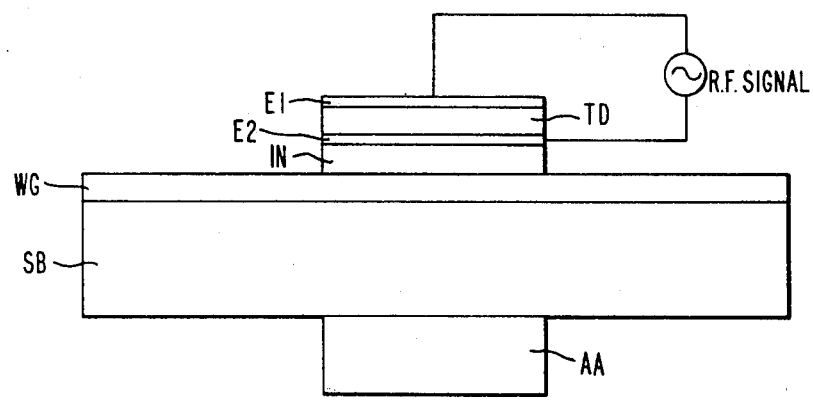
FIG. 1 is a schematic representation of the physical coupling existing between bulk acoustic waves and an optical waveguide on a common substrate, as part of a monolithic device according to the present invention.

Referring to FIG. 1, three layers of different refractive indices are shown with an incident acoustic bulk wave ABW. The substrate SB supports an optical wave guide WG onto which is deposited a transducer TD between electrodes E1, E1, WG and a superstrate insulator IN. The refractive indices are respectively $n_s$, $n_g$ and $n_i$. Light can propagate in waveguide modes if $n_g > n_s$, $n_i$. The insulator layer is chosen to be sufficiently thick that the evanescent field of the guided light does not penetrate into the metal of the adjacent electrode E2, where it would cause optical losses to be very high. As explained in the aforementioned article, since the bulk acoustic wave propagates through the waveguide WG normal to the direction of propagation of the guided light, the acoustic energy need propagate only through a few microns of the material in order to modulate the guided light. Thus, the modulation is not limited by acoustic attenuation until extremely high frequencies are reached. Thus the bulk acousto-optic waveguide interaction is capable of modulation to frequencies well in excess of current transducer fabrication capability.

Figure 2:
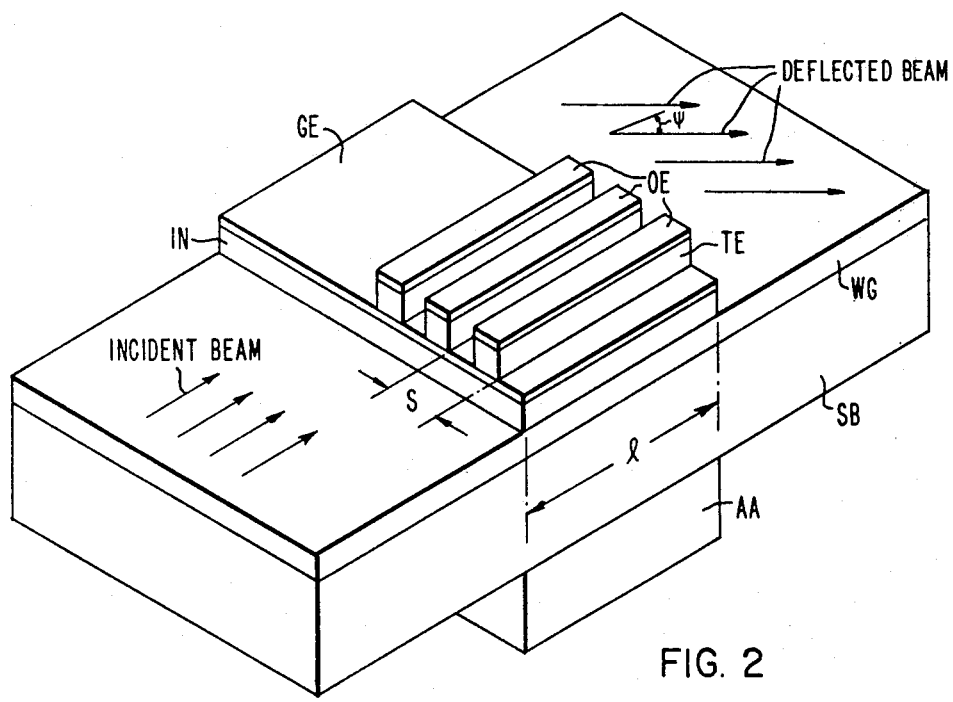
FIG. 2 shows a bulk acoustic wave light deflector according to the invention.

Longitudinal waves produce phase modulation of the guided light and shear waves produce mode conversion as well. Neither of itself, though produces light deflection. In accordance with the present invention, the acoustic transducer TD is segmented, as shown in FIG. 2, into equally spaced transducer elements TE with a common ground electrode GE and respective individual opposite electrodes OE. An RF voltage is applied to each transducer element in series or in parallel. As a result, light in the wave guide WG is deflected by the induced phase grating under the transducer array. The diffraction angle is $\phi$, where $\sin \phi = \lambda/s$; if $\lambda$ is the light wavelength in the optical waveguide WG, and s is the spacing between transducer elements. Such a transducer forms a fixed angle deflector for the guided light which can operate at very high frequencies. The speed of operation of the deflector according to the invention is much greater than the speed possible using acoustic surface waves.

The operation of the deflector of FIG. 2 can be explained as follows:

When an RF signal is applied t the electrodes, an acoustic wave propagates into the waveguide film under each transducer element. The refractive index of the wave guide will be changed through the photo-elastic effect, from n to $n + \Delta n$, where $$\Delta n = n - \tfrac{1}{2} n^3 pe,$$

and p is the photo-elastic constant (written here as a scalar quantity for simplicity) and e is the elastic strain amplitude. For unguided light the pertinent propagation constant is $$k = 2\pi n/\lambda_o,$$

where $\lambda_o$ is the vacuum wavelength of the light, and n the refractive index of the propagating medium. For a guided mode, the propagation constant is $$\beta = k/\sin \theta,$$

where $\theta$ is any of the allowed mode angles of propagation. The light beam propagating under the electrode structure sees a spatially periodic perturbation of refractive index induced by the bulk acoustic wave which in turn produces a periodic change of the phase of the light across a wave front. If the length of the transducer length, l, is sufficiently large in comparison to the spacing of the elements, s, i.e., if $$l >> s^2/2\pi\lambda_o$$

a thick, or Bragg grating is formed, which has the property of diffracting light into a single order at the angle $$\sin \psi \simeq \psi = \lambda/s$$

with respect to the normal direction, provided that the light is incident at this same angle (since Bragg diffraction requires incident and diffracted angles be the same). In the other limit, where the spacing is large, $$l << s^2/2\pi\lambda_o,$$

a thin, or Raman-Nath type grating will be produced, in which light is diffracted into multiple diffraction orders at angles $$M\psi \cong M\lambda/s \quad M = 0, \pm 1, \pm 2, \ldots$$

with respect to the normal direction. The diffraction will be strong for all large values of s when the light beam is incident in the normal direction.

For either the thick or the thin grating, the intensity of the light diffracted into the first order $I_1$, relative to the incident light intensity, $I_o$, is $$\frac{I_1}{I_o} = \left[\frac{J_1(\Delta\phi)}{J_o(\Delta\phi)}\right]^2 \approx \sin^2(\tfrac{1}{2}\Delta\phi)$$

wherein $J_1(\Delta\phi)$ and $J_o(\Delta\phi)$ are the first and zero$^{th}$ order Bessel functions of the modulation index, $\Delta\phi$. The modulation index $\Delta\phi$, is the phase change seen by the light in the acoustic field, $$\Delta\phi = \frac{2\pi ln}{\lambda_o} = -\frac{\pi ln^3 pe}{\lambda_o}.$$

Writing the elastic strain amplitude in terms of the applied acoustic power density P, acoustic velocity in the waveguide medium v, and density of waveguide medium $\rho$, the diffracted light intensity is shown to be $$\frac{I_1}{I_o} = \tfrac{1}{2}\left[\frac{\pi l}{\lambda_o}\right]^2 \left[\frac{n^6 p^2}{\rho v^3}\right] P = \tfrac{1}{2}\left[\frac{\pi l}{\lambda_o}\right]^2 M_2 P$$

where $$M^2 = \frac{n^6 p^2}{\rho v^3}$$

is the well known acousto-optic figure of merit of the waveguide material.

The structure shown in FIG. 2 may be used as a modulator or switch by impressing the desired information on the RF signal applied to the transducer. The speed with which this may be done will be limited by the transit time of the acoustic wave across the waveguide. For an acoustic velocity of $5 \times 10^5$ cm/sec. and a waveguide thickness of 0.5 μm the transit time is $2 \times 10^{-10}$ seconds. Reflection of the acoustic wave from the bottom of the substrate could cause interference with the incoming signal, but such reflections can be suppressed by addition of an acoustic absorber AA on the substrate, as shown in FIG. 2.

Figure 3A:
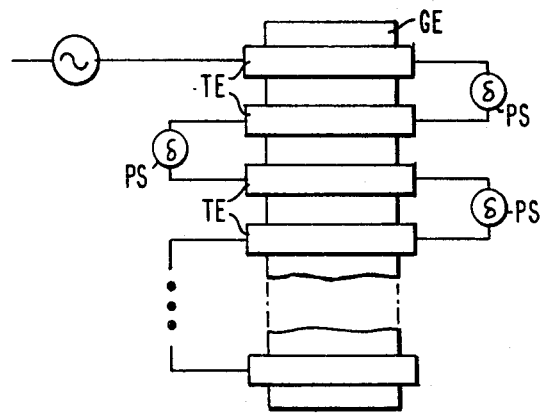
FIGS. 3A and 3B show two possible connecting arrangements of the transducer elements of the deflector of FIG. 2.
Figure 3B:
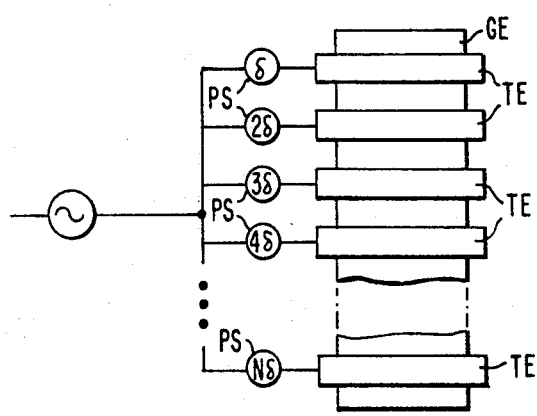

It is well known in radar antenna theory that a radiating beam from a phased array may be steered in direction by applying a linear phase slope across the elements. This same idea has also been applied to optical phased arrays in a membrane light modulator and also in an electro-optic crystal type of beam steering device. By introducing a linear phase factor across the transducer elements TE of FIG. 2, a steering effect will be imparted to the guided light. The multiple transducer elements TE depicted in FIG. 2 can be connected with a linear phase factor across the transducer array in the two ways shown in FIGS. 3A and 3B. A series-connected arrangement is shown in FIG. 3A. Phase shifters PS are interposed between consecutive transducer elements TE which are in series between the applied RF signal and the ground electrode of the last transducer element. This is generally preferable, since the same phase, δ, is then applied between each element. It is also desirable since the capacity of the transducer will be lower and thus capable of operating at higher speeds. FIG. 3B illustrates the second arrangement in which the phase shifters PS and transducer element TE are connected in parallel between the applied RF signal and the common ground electrode GE.

The angle through which the light beam is diffracted will be determined by the ratio, $\lambda/s$, and also by the phase δ applied between elements. By adjusting the phases the beam can be steered in direction. There are several ways in which phase shifting elements PS can be introduced between the transducer elements TE. One method is to use Schottky barrier diodes whose capacity is controlled by means of an applied voltage. This method is the one chosen for A/D converter described hereinafter by reference to FIG. 4 and it will be explained in that context.

Another method is to use a resonant circuit whose resonance frequency is the same as the resonant frequency of the transducer. As the applied frequency is moved off resonance, phase shift is introduced.

The light beam diffracted by the transducer array will have the following properties:

(1) if there are N elements, the main lobe of the diffracted beam can be directed into N resolvable beam positions, according to the Rayleigh criteria, (2) when a linear phase slope of P complete cycles is applied across the array, so that the phase of the nth element is $$\delta_n = 2\pi n P/N,$$

the angular position of the main lobe of the first diffraction order is deflected to an angle $\psi$ given by $$\psi \approx \frac{\lambda}{s}\left[1 + \frac{P}{N}\right].$$

Accordingly, arrays of phase shifting devices PS and bulk acoustic wave transducers TE, as shown in FIGS. 3A and 3B, are used to scan the guided light passing under the transducer elements in response to either the frequency or amplitude of the applied electrical signal depending upon the selected construction and arrangement of the phase shifters PS introducing a phase shift δ which are inserted between elements. FIG. 3A shows a series array of constant phase shifters PS inserted between transducer elements TE. If the phase shift produced for each element PS is proportional to the frequency of the input signal (as would be the case for an array of identical circuits near resonance) then the optical wave will be deflected at an angle in the plane of the wave guide which is a function of this frequency. On the other hand, if the phase shift δ is proportional to voltage, as in the case of a Schottky diode the angular deflection becomes proportional to the value of the applid voltage. Similarly, in the case shown in FIG. 3B, where devices PS induce a progressively greater phase shift along the array, if the shift δ is made proportional to frequency, or voltage, changes in either quantity can be used to deflect the guided light in the waveguide plane. As a result, spectrum analysis of a signal is made possible by impressing the signal upon the bulk array containing frequency dependent phase shifting elements PS then, by detecting the light deflected into each angular region. The latter operative step is most easily done by an integrated optical lens followed by a photo-detector array.

Figure 4:
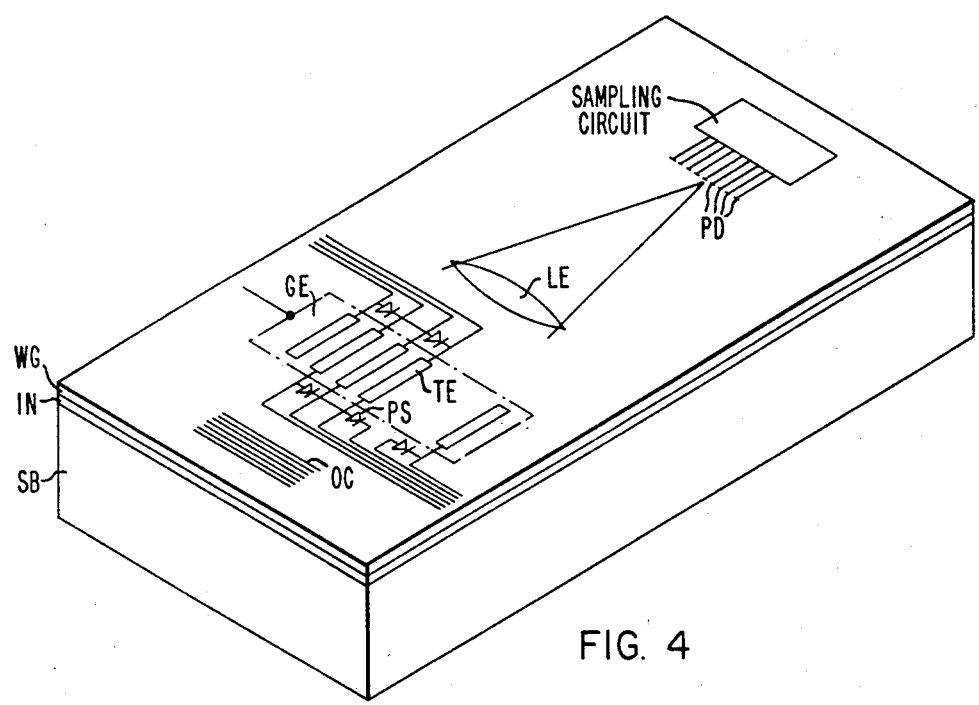
FIG. 4 is a schematic representation of the integrated optics analog-to-digital converter according to the invention; using diodes as phase shifting elements associated with the transducer element of FIG. 2.

The phased array bulk acoustic wave thin-film deflector of FIG. 2 lends itself to use as a Fourier transforming device such as a spectrum analyzer or a correlator. It has even more interesting characteristics when used to implement a high speed A/D converter with an integrated optic approach applied to all the components. One scheme for constructing a monolithic A/D converter is illustrated in FIG. 4. A silicon wafer is used as the substrate, although some other semiconductor might also be used. The necessary electrical components are fabricated directly on the semiconductor substrate. The integrated components include p-i-n diode photo-detectors PE and phase shifters PS typically shown in FIG. 4 as voltage controlled diodes. Subsequently, an optical insulating film of low index, for example sputtered $SiO_2$, is deposited over the substrate, and a high index optical waveguide film is deposited on top of the insulating film. The waveguide film may consist, for instance, of a sputtered layer of Corning 7059 glass, or a very high index material such as $Nb_2O_5$. The array of transducer elements TE described in FIG. 2 is next formed by deposition on the waveguide, over an appropriate insulator film, and elements TE are electrically connected to the phase-shift diodes PS. In order to facilitate the connection, it may be more convenient to have the transducer ground electrode disposed above the array rather than below. An integrated optic lens is then fabricated integrally to the substrate by thin film deposition, or geodesic technique, and disposed in such a way as to be optically responsive to the deflected light under the array of transducer elements TE. A photo-detector array is built on the substrate in the focal plane of the lens.

As an alternative to an integrated optic lens in the waveguide, the light beam may be focused by the array itself when the spacing between elements TE is so made as not to be strictly periodic, but rather to vary from one end to the other. The effective focal length of such an array is determined by the variation in spacing. An array of phase or amplitude modulating elements TE spaced along the x axis at distances $X_n$ from the y axis will act as a zone plate focusing device with focal length F (for small angles) when $$X_N^2 = F \cdot 2\pi N/\lambda.$$

Therefore, consecutive transducer elements TE of the array have a spacing $\Delta X_N$ equal to $$\Delta X_n = (\pi NF/\lambda X).$$

For a 2 mm long array of transducer elements TE whose element spacing varies from 1 to 2 microns, the focal length is on the order of 1–2 cm. Similarly, focusing can be done by controlling the phase differences across the array in a quadratic manner.

In operation, a light source impinging on a coupler CO to the optical waveguide WG is provided for injecting through the waveguide a parallel beam of light. In FIG. 4 the light is shown coupled into the waveguide from an external source, but it could as well come from a laser fabricated directly in the waveguide. An incoming control signal voltage, after appropriate preprocessing, is applied to the phase shifters PS, so that for each voltage increment the light beam is shifted to a different photo-detector PD. Thus, there is a one-to-one correspondence between signal voltage levels and the photo-detectors of the array. The number of distinguishable voltage levels that can be read is just equal to the number of resolution elements in the array. The sampling time of the photo-diode signals will be limited by the travel time of the acoustic wave through the waveguide film, so that the sampling can be done at very high rates.

This implementation of an A/D converter, in addition to allowing processing to be done at very high data rates, may also be more economical to fabricate for lower data rates. The integration of the entire device on a single substrate will permit inexpensive batch production of large numbers of such devices.

In the previous embodiments (FIGS. 2, 3A, 3B and 4) when scanning the guided optical beam, one has recourse to a phase shift $\delta$ induced in the RF drive signal that is applied to the various transducer elements. In this effect, use is made, as illustratively shown in FIG. 4, of Schottky barrier diodes.

Figure 5:
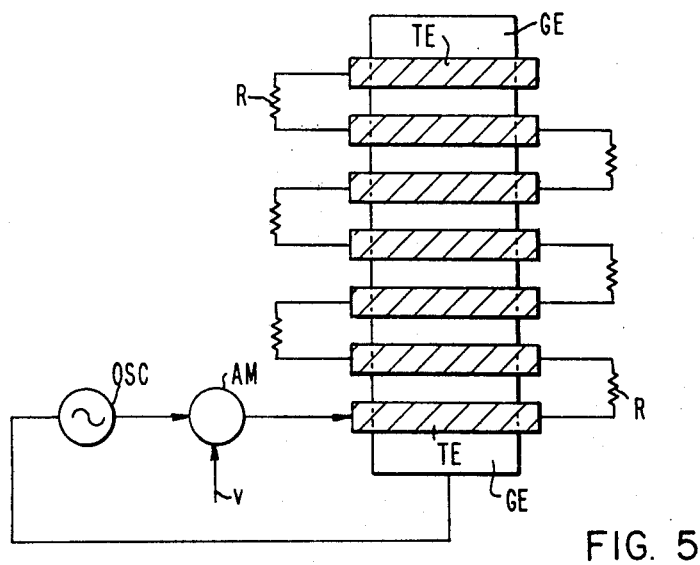
FIGS. 5, 6, and 7 show three respective arrangements for the phase shifting elements and transducer elements differing from those shown in FIGS. 3A and 3B.
Figure 6:
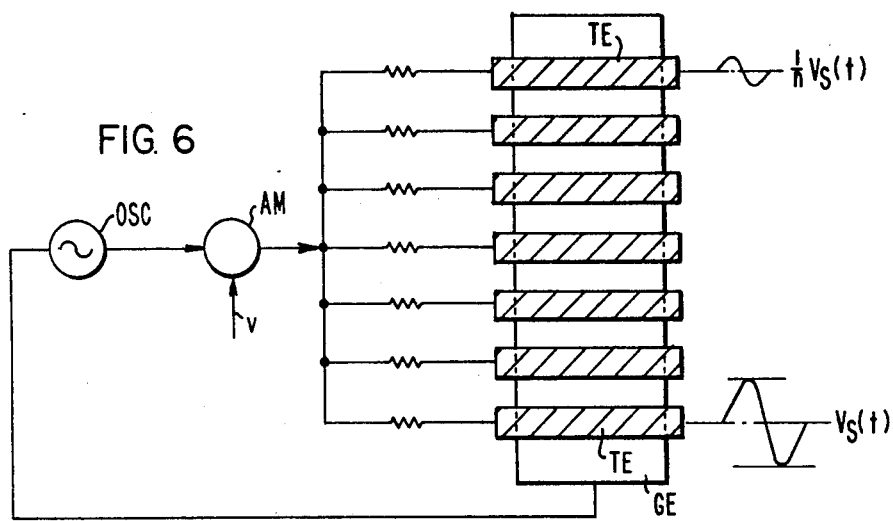
Figure 7:
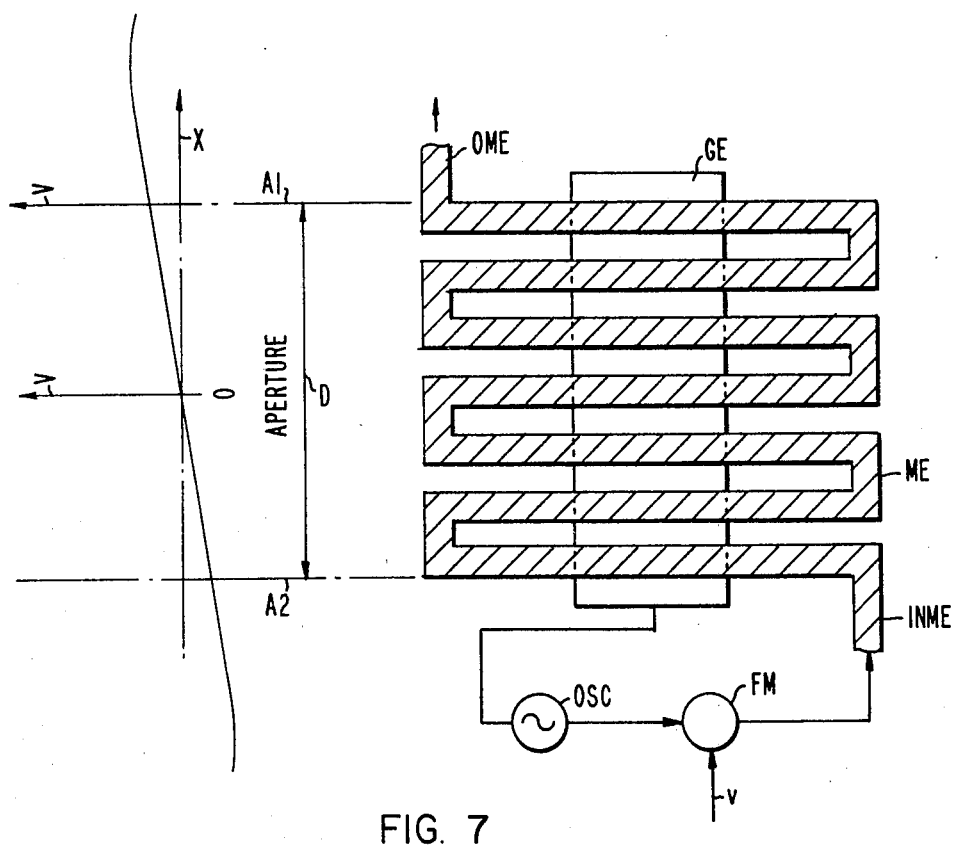

Referring now to FIGS. 5, 6 and 7 the RF drive signal applied to the various transducer elements is kept with a constant phase shift, however voltage drops at the various point of application of the driving voltage are caused so as to reduce progressively from transducer element to transducer element the acoustic driving force, thus the resulting optical phase shift of the guided light, from channel to channel.

Considering FIG. 5, a series of resistors R are formed between the successive transducer elements arranged in series. The resistors may be fabricated directly on the common substrate, or they could be part of the resistance of the transducer element TE itself. As a result of such chain of resistor and transducer elements, the voltage seen by each transducer element is dropped by the amount of voltage E across the pair of resistor and transducer element. If $E_0$ is the initial voltage applied by the RF signal driving the array of transducer elements, the first transducer element will induce an optical phase shift in the light beam proportional to:

$$\Delta\phi_0 \approx E_0^2 \times \left( -\frac{\pi \ln^3}{\lambda_0} \rho \right). \tag{1}$$

The second transducer element will in turn induce an optical phase shift:

$$\Delta\phi_1 \approx (E_0 - \Delta E)^2 \times \left( -\frac{\pi \ln^3}{\lambda_0} \rho \right), \tag{2}$$

and so on from one transducer element TE to the next.

Expanding for small $\Delta E/E_0$ and subtracting (1) from (2), it is seen that each transducer element induces an optical phase shift difference from its neighbor by $$\Delta\phi_0 - \Delta\phi_1 = 2\Delta E \left( \frac{\pi \ln^3}{\lambda_0} \rho \right),$$

which is the desired optical phase shift for steering the light beam as a whole.

Controlled steering of the beam is accomplished by applying a control voltage v, which is used to amplitude modulate the drive oscillator OSC by means of a modulator AM.

FIG. 6 is an embodiment of the invention with parallel resistors of variable value $P_1, P_2 \ldots P_{n-1}$. The operation of this embodiment is directly understood by comparison with the series resistor arrangement of FIG. 5.

In this fashion, the deflected light beam in the optical waveguide WG is scanned in angle for a constant signal voltage while gating the photo-detector or pulsing the light source at the peaks of the oscillator voltage.

Instead of using a resistor added to or incorporated in each transducer element, it is possible to cause a controlled voltage drop across the array of transducer elements by introducing delays between each transducer element. In such a case, modulation of the RF signal is effected by frequency modulation in relation to the control voltage v. Thus, referring to FIG. 7, the series arrangement of transduer elements results from of a continuous and linear disposition of both the transducer electrode and the piezoelectric material so as to form a delay line like a meander ME. If the delay across this meander is such that, at the sampling frequency of the oscillator, some fraction of the full wave (say 20%) falls across the optical aperture $A_1A_2$, a roughly linear phase shift, as shown by the curve added in FIG. 7, will be present in the array as the zero voltage point progresses through the center O of the delay line. If the signal voltage is replaced by into a frequency modulation of the driving oscillator, the slope of the traveling voltage wave at its zero crossing, and therefore the phase shift across the optical aperture, can be made proportional to the signal voltage v. Thus the scan angle will be determined by the signal voltage v.

We claim:

1. A monolithic optical analog-to-digital (A/D) converter comprising:
   a common substrate having a general direction and a surface plane;
   an optical waveguide formed on said substrate in said phase and along said surface adapted for passing guided light therethrough;
   an array of ultrasonic transducer elements integrated with said optical waveguide in a zone of acoustic interaction therewith across said general direction for generating bulk acoustic waves normally of said optical waveguide in said zone and for interaction with the guided light;
   phase shifter means integrated with said optical waveguide and associated with said transducer elements for introducing cummulative phase shifts of identical relative magnitude between consecutive transducer elements of said array thereby to cause deflection of the guided light;
   said phase shifter means being controlled by an analog signal to establish a deflection angle for said guided light in relation to the magnitude thereof;
   an array of photo-detecting devices integrated with said waveguide for receiving guided light deflected by said phase shifter devices; and
   means responsive to said photo-detecting devices for generating a digital signal in relation to said deflection angle and said analog signal.

2. The A/D converter of claim 1 with an optical lens integrated with said waveguide and intersposed between said zone and said array of photo-detecting devices; each of said photo-detecting devices being at a focal length of said optical lens with respect to deflected light of said waveguide.

3. The A/D converter of claim 1 with said transducer-elements being disposed across said general direction with a spacing between consecutive transducer elements varying in a quadratic manner from one end of said array of transducer elements to the other end; whereby incident light is focused after interaction with said bulk acoustic waves and deflection of the guided light; said photo-detecting devices being at a focal length with respect to the deflected light of said optical waveguide.

* * * * *

UNITED STATES PATENT AND TRADEMARK OFFICE
CERTIFICATE OF CORRECTION

PATENT NO. : 4,395,702

DATED : July 26, 1983

INVENTOR(S) : Milton Gottlieb & Gerald B. Brandt

It is certified that error appears in the above—identified patent and that said Letters Patent is hereby corrected as shown below:

Claim 1, column 10, line 12, cancel "cummulative" and substitute -- cumulative --.

Signed and Sealed this

Fourth Day of October 1983

[SEAL]

Attest:

Attesting Officer

GERALD J. MOSSINGHOFF

Commissioner of Patents and Trademarks